United States Patent [19] [11] 4,134,770

Emoto et al. [45] Jan. 16, 1979

[54] GELATIN-CONTAINING PHOTOGRAPHIC LAYER INCORPORATED WITH HARDENER

[75] Inventors: Kazuhiro Emoto; Kenji Yabuta; Kiyoshi Yamashita; Kiyoshi Futaki, all of Nagaokakyo, Japan

[73] Assignee: Mitsubishi Paper Mills, Ltd., Tokyo, Japan

[21] Appl. No.: 835,213

[22] Filed: Sep. 21, 1977

[30] Foreign Application Priority Data

Sep. 22, 1976 [JP] Japan ............................... 51-112866
Nov. 26, 1976 [JP] Japan ............................... 51-141957

[51] Int. Cl.[2] ......................... G03C 1/40; G03C 1/30; C09H 7/00

[52] U.S. Cl. .................................... 96/100 R; 96/111; 260/117; 260/593 R; 106/125; 260/561 S; 560/150; 260/592

[58] Field of Search ........................... 96/111, 67, 100; 260/117, 561 S, 481 R; 106/125

[56] References Cited

U.S. PATENT DOCUMENTS

| | | | |
|---|---|---|---|
| 3,490,911 | 1/1970 | Buyness et al. | 96/111 |
| 3,868,257 | 2/1975 | Horii et al. | 96/111 |
| 4,039,520 | 8/1977 | Habu et al. | 260/117 |

FOREIGN PATENT DOCUMENTS

| | | | |
|---|---|---|---|
| 49-24435 | 4/1974 | Japan | 96/111 |

*Primary Examiner*—Won H. Louie, Jr.
*Attorney, Agent, or Firm*—Cushman, Darby & Cushman

[57] ABSTRACT

Compounds of the formula $$(CH_2=CH-SO_2-CH_2-CH_2-CO-A)_{\overline{n}}P,$$

wherein each A, which may be either the same or different, is selected from direct bond, —NH— and —O—, P represents an n-valent aliphatic moiety which can be interrupted by a nitrogen atom or phenylene radical, and n is 3 or 4, provided that when A is direct bond the nitrogen atom interrupting said aliphatic moiety can be connected through the direct bond, can be effectively used as gelatin hardeners in gelatin-containing photographic layers. Examples of the compounds include 1,1,3,3-tetrakis(vinylsulfonylpropionamido)propane, α,α'-tetrakis(vinylsulfonylpropionamido)-p-xylene, 1,2,3-tris[β-(vinylsulfonyl)propionyloxy]propane, N,N',N''-tris[β-(vinylsulfonyl)propionyl]diethylenetriamine, and tetrakis[β-(vinylsulfonyl)propionyloxymethyl]methane.

14 Claims, No Drawings

GELATIN-CONTAINING PHOTOGRAPHIC LAYER INCORPORATED WITH HARDENER

The present invention relates to hardeners for photographic gelatin and a method for hardening a gelatin-containing photographic layer.

It has long been known that in order to be of practical use, a gelatin-containing photographic layer must be hardened. For this purpose, as known well, the gelatin-containing layers such as, for example, silver halide emulsion layer, subbing layer, backing layer, antihalation layer, intermediate layer, ultraviolet absorbing layer, and protecting layer are incorporated with a gelatin hardener capable of physically or chemically combining with gelatin by crosslinking during the manufacturing process to increase mechanical strengths of the layers and also to improve resistances of the layers against dissolution, swelling, and peeling during development and other treatments. Of the many compounds heretofore proposed as gelatin hardeners, those which have been known as particularly useful are aldehydic compounds such as formaldehyde, mucochloric acid and formaldehyde addition products; nitrogen-containing six-membered heterocyclic compounds having two or more reactive chlorine atoms in the molecule; compounds having reactive vinyl groups such as divinyl sulfone, divinyl ketone, and N,N', N''-triacryloylhexahydro-1,3,5-triazine; compounds having in the molecule two or more reactive three-membered ring such as ethyleneimino and epoxy groups; and polymeric hardeners such as dialdehyde starch and a maleic half ester of polyvinyl alcohol or starch. However, when used in gelatin-containing photographic layers, these known hardeners produce results which are not always desirable with respect to physical and photographic properties. Formaldehyde, which has been used most widely, has several disadvantages in that it produces post-hardening, that is, gradual hardening of the applied photographic layer takes place so that the degree of hardening becomes difficulty controllable; it has a tendency to produce fogging of the emulsion and when used in color-photographic emulsion, it causes a decrease in sensitivity or an abnormal color development. Other known hardeners have also respective difficulties. Some of them discolor photographic layers; some affect markedly the hydrogen ion concentration of the emulsion with the progress of hardening, thus causing deterioration of photographic properties; and some emit a strongly disagreeable odor which detracts from the working efficiency during the manufacturing or is harmful for the human body. Others are expensive, though desirable in photographic properties, or require special application techniques such as dissolving in special organic solvents and then dispersing in the emulsion. Such disadvantages keep many of the compounds from actual use.

It is also well known that hardeners having reactive vinyl groups have been advantageously used for the above purpose. An earlier example is divinyl sulfone described in German Pat. No. 872,153 (1949). This compound is unsuitable for general use, because it is strongly irritant and toxic to the human body. To improve the disadvantages of divnyl sulfone, an aromatic compound containing in the molecule two or more vinylsulfonyl groups was proposed in German Patent Publication 1,100,942 (1961) and later certain compounds having vinylsulfonylalkyl groups were patented, as in U.S. Pat. No. 3,490,911 (1970). These hardeners of the vinyl sulfone type are characterized by rapid hardening action, slight post-hardening, relatively low over-hardening effect, keeping the photographic emulsion layer from becoming horny (or brittle) and less permeable to a developer solution, relatively low degree of photographically undesirable effects such as fogging and staining, and, in addition, inertness to color-forming couplers in a color-photographic emulsion, contrary to formaldehyde hardeners which react with the coupler, thus interfering with formation of color or causing discoloration. Compounds of this type are good hardeners as described above, but not satisfactory enough for general use, because most of these compounds are expensive and some of them require a special application procedure such as, for example, use of a large amount of an organic solvent or use of a limited amount of the hardener to avoid troubles caused by the change in emulsion viscosity with time.

Under the circumstances, it was thought useful to find a vinylsulfonyl compound which is readily synthesizable and is usable without requiring a special use procedure.

One object of the present invention is to provide effective hardeners for photographic gelatin and for gelatin-containing photographic emulsions. Another object of the present invention is to provide a method for effectively hardening it gelatin-containing photographic layer. Other objects of the present invention will appear herein.

The inventors have found that use of the compounds represented by the following general formula (I) can completely overcome the difficulties of the conventional hardeners:

$$(CH_2=CH-SO_2-CH_2-CH_2-CO-A)_{\overline{n}}P \qquad (I)$$

wherein each A, which may be either the same or different, is selected from direct bond —NH— and —O—, P represents an n-valent aliphatic moiety which can be interrupted by a nitrogen atom or phenylene radical, and n is 3 or 4, provided that when A is direct bond the nitrogen atom interrupting said aliphatic moiety can be connected through the direct bond.

The compounds represented by the general formula (I) are novel compounds entirely different from known compounds, from compounds proposed or disclosed in, for example, the above-said German Patent Publication No. 1,100,942, U.S. Pat. No. 3,490,911, or Japanese Patent Application "Kokai" (Laid-Open) No. 44,164/76, and from compounds proposed in Japanese Patent Application "Kokai" (Laid-Open) No. 24,435/74. The hardening characteristics of the present compounds are also better than those of conventional hardeners.

When a compound of the general formula (I) is incorporated in gelatin-containing layers, there is hardly brought about any of the undesirable phenomena such as fogging and desensitization which deteriorate photographic properties, ground staining or discoloration, change in hydrogen ion concentration of the photographic layer, and reaction with a color-coupler in color-photographic emulsion of the chromogenic development type. The present hardener, moreover, permits of easy control of the hardening degree, because it retains the quick hardening action common to the compounds having vinylsulfonyl groups and does not brought about a post-hardening phenomenon, that is, the gradual progress of hardening of the photographic layer during storage.

One of the characteristic features of the present group of compounds, as compared with conventional vinylsulfonyl compounds, is a remarkably small effect on the viscosity of a photographic emulsion throughout the course of its manufacture. One of the favorable characteristics of the present compound, as contrasted to the conventional vinylsulfonyl compounds, is its strong affinity for water so that no special organic solvent is required in applying the compound. The present compound has also advantages over known vinylsulfonyl compounds in that undesirable effects on the human body and physiological effects in contacting with the skin are both small. Those characteristics of the present compound as mentioned above which have never been manifested by conventional vinylsulfonyl compounds seem to be due, for the most part, to the presence of linkages of carbonyl derivatives such as amide and ester linkages introduced into the molecular structure. On account of a strong polarity of these lkinkages, volatility of the compound is suppressed and the affinity for water is increased, resulting in reduced lipophilicity and, hence, in reduced toxicity. Since the present compound has a structure closely similar to that of gelatin, the difference in physical properties between the hardened portion and the unhardened portion is so slight that a photographic emulsion incorporated with the present compound does not undergo a large change in viscosity with the progress of hardening.

A particularly distinguished feature of the compound of this invention is that since it contains in the molecule three or more vinylsulfonyl groups having film hardening activity, it exerts stronger hardening effect to a photographic layer shortly after application of the layer, as compared with known hardeners having two vinylsulfonyl groups, as shown later in Examples.

Of the compounds having the general formula (I), those particularly useful are selected from the compounds of the following general formula (II):

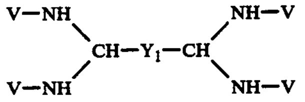
(II), wherein V represents $CH_2=CHSO_2CH_2CH_2CO$, and $Y_1$ represents a phenylene radical or $-(CH_2)_m-$, where m is zero or an integer from 1 to 3.

-continued

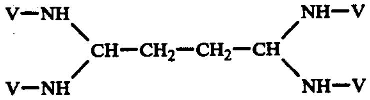
(2)

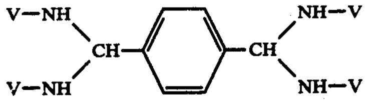
(3)

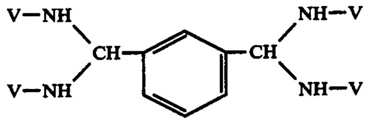
(4)

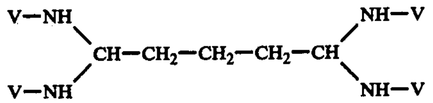
(5)

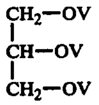
(6)

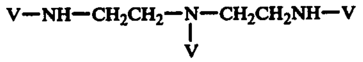
(7)

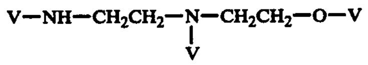
(8)

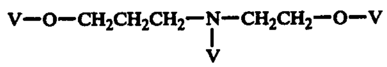
(9)

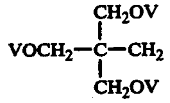
(10)

$(VOCH_2CH_2)_3N$ (11)

$CH_3C(CH_2OV)_3$ (12)

$CH_3CH_2C(CH_2OV)_3$ (13)

Examples of the synthetic methods for the typical compounds used in this invention are given below.

SYNTHESIS EXAMPLE 1

Synthesis of the compound (1), 1,1,3,3-tetrakis(vinylsulfonylpropionamido)propane,

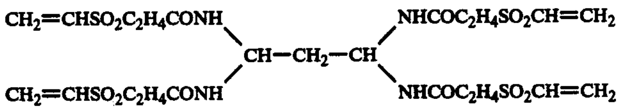

Examples of compounds suitable for use are listed below, but the examples are not intended to limit the scope of the invention. In the following examples, V represents $CH_2=CHSO_2CH_2CH_2CO$.

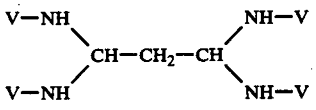
(1)

6.5 Grams of vinylsulfonylpropionamide and 1.6 g of 1,1,3,3-tetramethoxypropane were fused together by heating at 80° C. As soon as a uniform solution had been obtained, 0.2 ml of concentrated hydrochloric acid was added to the solution and heated for 20 minutes at 80° C. The reaction mixture was cooled to room temperature, washed with ethyl acetate, and recrystallized from 100 ml of aqueous ethanol to obtain 6.1 g of white crystals melting at 183° to 184° C. (polymerization). The results of elemental analysis were as shown below.

| | C (%) | H (%) | N (%) |
| --- | --- | --- | --- |
| Found | 40.17 | 5.16 | 8.39 |
| | 40.20 | 5.21 | 8.18 |
| Mean | 40.19 | 5.19 | 8.29 |
| Theoretical | 40.11 | 5.27 | 8.13 |

SYNTHESIS EXAMPLE 2

Synthesis of the compound (2), 1,1,4,4-tetrakis(vinylsulfonylpropionamido)butane,

SYNTHESIS EXAMPLE 4

Synthesis of the Compound (6)

Synthesis of 1,2,3-tris[β-(β-chloroethylsulfonyl)propionyloxy]propane: Into a mixture of 1.3 g of glycerol and 3.5 g of pyridine, was added 9.6 g of β-(β-chloroethylsulfonyl)propionyl chloride and the mixture was stirred for 30 minutes. The reaction mixture was washed twice with 30 ml of methanol, then admixed with 30 ml of water, and left standing at room temperature to crystallize the intended product. There were obtained 6 g of

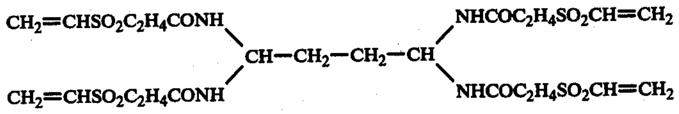

In a manner similar to that in Synthesis Example 1, the compound (2) melting at 206°-208° C. was synthesized by using 2,5-dimethoxytetrahydrofuran in place of the 1,1,3,3-tetramethoxypropane.

SYNTHESIS EXAMPLE 3

Synthesis of the compound (3), α,α'-tetrakis(vinylsulfonylpropionamido)-p-xylene, white crystals melting at 69°-70° C.

Synthesis of the compound (6): 1.8 Grams of 1,2,3-tris[β-(β-chloroethylsulfonyl)propionyloxy]propane was dissolved in 50 ml of acetone, then admixed with 1.0 g of triethylamine and stirred for 2 hours at room temperature. The precipitate was removed by filtration. The filtrate, pale yellow in color, was admixed with activated carbon and stirred for 15 minutes. After re-

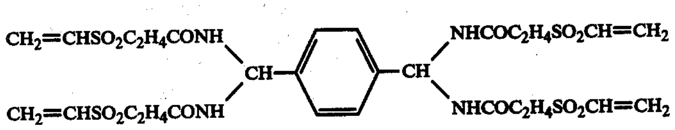

In a manner similar to that in Synthesis Example 1, the compound (3) melting at 236°-240° C. was synthesized by using terephthalaldehyde in place of the 1,1,3,3-tetramethoxypropane.

The following compound can be synthesized by a procedure similar to that mentioned above.

Compound (4), α,α'-tetrakis(vinylsulfonylpropionamido)-m-xylene (melting point, 183.5°-185° C.), moval of the activated carbon by filtration, the filtrate was freed from the acetone and dried in vacuo to obtain 1.4 g (92.3% yield) of the intended product in the form of colorless liquid.

SYNTHESIS EXAMPLE 5

Synthesis of the Compound (7)

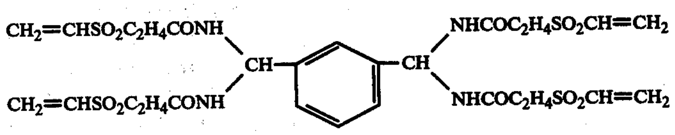

Compound (5), 1,1,5,5-tetrakis(vinylsulfonylpropionamido)pentane (melting point, 118°-119° C.), Synthesis of N,N',N''-tris[β-(β-chloroethylsulfonyl)propionyl]diethylenetriamine: Into 100 ml of dioxane,

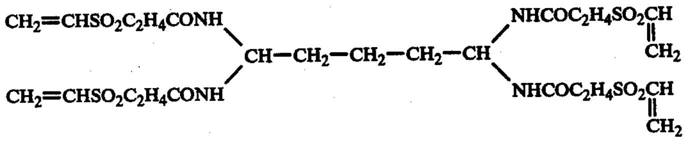

Synthesis of this compound was carried out by following the procedure described in Synthesis, 1972, pp. 136-138. Catalysts which were tested included p-toluenesulfonic acid, methanesulfonic acid, acetic acid, and trichloroacetic acid, but inorganic acids such as hydrochloric acid and sulfuric acid were found more suitable than said organic acids. Better results were obtained by carrying out the reaction in a system containing no solvent than in a system containing a solvent as reaction medium.

were added 13 g of β-(β-chloroethylsulfonyl)propionyl chloride and 4.8 g of pyridine. To the mixture, was added with stirring 2 g of diethylenetriamine. The resulting mixture was stirred for 2 hours at room temperature. The precipitate insoluble in dioxane was collected by filtration and recrystallized from 30 ml of methanol to obtain 6.5 g of the intended compound melting at 120°-121° C.

Synthesis of the compound (7): Into a solvent mixture comprising 150 ml of acetone and 10 ml of dimethylformamide, were added 5 g of N,N',N''-tris[β-(β-chloroethylsulfonyl)propionyl]diethylenetriamine and 2.2 g of triethylamine. The mixture was stirred for 2 hours at room temperature and the precipitate was removed by filtration. The filtrate was freed from the solvent by distillation, leaving behind 3.3 g of the intended compound in the form of colorless liquid.

SYNTHESIS EXAMPLE 6

Synthesis of the Compound (8)

Synthesis of N,N',O-tris[β-(β-chloroethylsulfonyl)-propionyl]-2-(2-aminoethylamino)ethanol: Into 100 ml of dioxane, were added 1.7 g of 2-(2-aminoethylamino)ethanol and 10.9 g of β-(β-chloroethylsulfonyl)propionyl chloride. To the mixture, was added with stirring at room temperature 4.0 g of pyridine. The resulting mixture was stirred for 2 hours. The precipitated solids insoluble in dioxane were collected by filtration and recrystallized from 100 ml of methanol to obtain 6.05 g of white crystals melting at 112°-115° C.

Synthesis of the compound (8): In 40 ml of acetone, was dissolved with heating 3.9 g of N,N',O-tris[β-(β-chloroethylsulfonyl)propionyl]-2-(2-aminoethylamino)ethanol. After addition of 2.0 g of triethylamine, the mixture was stirred for 3 hours at room temperature. After removal of the precipitate by filtration, the filtrate was freed from the solvent by distillation to obtain 2.5 g of the intended compound in the form of colorless liquid.

SYNTHESIS EXAMPLE 7

Synthesis of the Compound (10)

Synthesis of tetrakis[β-(β-chloroethylsulfonyl)propionyloxymethyl]methane: Into 100 ml of dioxane, were added 15.3 g of β-(β-chloroethylsulfonyl)propionyl chloride, 2.4 g of pentaerythritol, and 5.5 g of pyridine. The mixture was stirred for 2 hours at room temperature to precipitate gradually the crystals. The crystals were collected by filtration and recrystallized from 80 ml of methanol to obtain 5.2 g of white crystals melting at 139°-140° C.

Synthesis of the compound (10): In 80 ml of acetone, was dissolved 3.4 g of tetrakis[β-(β-chloroethylsulfonyl)propionyloxymethyl]methane. After addition of 1.8 g of triethylamine, the mixture was stirred for 5 hours at room temperature and the precipitated crystals were removed by filtration. The filtrate was freed from the solvent by distillation and the residue was recrystallized from a solvent mixture of 1 ml of acetone and 10 ml of methanol to obtain 2.3 g of white crystals melting at 68°-69° C.

In incorporating the present compound as a hardener into a coating solution for forming gelatin film, the amount to be added to the compound is generally 0.01 to 100%, preferably 0.1 to 10% by weight based on dry gelatin, depending on the type, physical properties and photographic characteristics of the intended gelatin film. Addition of the hardener compound can be performed at any stage during the preparation of the coating solution for forming gelatin film. When the compound is to be added to, for example, a silver halide emulsion, it is added preferably at a stage subsequent to the second ripening of the emulsion. It can be added in the form of aqueous solution or, if necessary, in the form of solution in a suitable organic solvent or a mixture thereof with water.

The gelatin for use in the gelatin-containing layer according to this invention can be any of the alkali-treated gelatin, acid-treated gelatin and modified gelatins (modified gelatins described in, for example, Japanese Patent Publication No. 4,854/63 and No. 12,237/65; U.S. Pat. No. 2,525,753) or a mixture thereof or, if necessary, a combination of said gelatins with one or more natural or synthetic binders (binders such as, for example, polyvinyl alcohol, polyvinylpyrrolidone, sodium polyacrylate, polyacrylamide, hydroxypropylstarch, dextrin, dextran, maleate half ester of starch, styrene-maleic acid copolymer, propylene glycol alginate, and polymers described in Japanese Patent Publication No. 21,574/61).

In addition to the present hardener, other known organic hardeners of the vinyl sulfone, ethyleneimine, epoxy, active halogen, isocyanate and carbodiimide types and inorganic hardeners such as chromium (III) salts and aluminum (III) salts may be included in the gelatin-containing photographic layer.

The invention is illustrated below in detail with reference to Examples, but the invention is not limited thereto.

EXAMPLE 1

Compounds (1) to (5) were each added to a gelatin composition in an amount corresponding to 2% by weight of gelatin. The resulting composition was applied onto a sheet of resin-coated paper and set by placing on ice. After having been air-dried, the gelatin layer was heated at 90° C. for 60 minutes and tested for the hardening degree. The results obtained were as shown in Table 1.

Table 1

| Compound No. | Hardening degree (g) |
|---|---|
| (1) | 108 |
| (2) | 95 |
| (3) | 84 |
| (4) | 87 |
| (5) | 65 |
| None | <2 |

"Hardening degree," as herein referred to, was determined in the following way: Pretreatment of the test specimen was conducted by warming the test specimen and immersing it in a color developer solution (Kodak Co.) at 20° C. for 3 minutes. A ball-pointed needle was placed on the pretreated specimen at right angle to the surface. The ball point, 1 mm in diameter, was allowed to travel in contact with the surface at a rate of 1 cm/sec. The hardening degree is the minimum load, in g, under which the ball point marks a scratch on the gelatin surface.

As is clear from Table 1, the present compounds showed a remarkable hardening effect on gelatin.

EXAMPLE 2

The compound (1) was added to a high-sensitivity silver iodobromide emulsion in an amount corresponding to 2% by weight of gelatin. The emulsion was coated on a triacetylcellulose base film and dried. The coating layer showed a dissolution temperature of 69° C. after two days and became insoluble even in boiling water after one week. The dissolution temperature of a coating layer, used as control, containing no hardener was 31° C. The hardened emulsion layer showed none of photographically undesirable effects.

EXAMPLE 3

A print paper, which had been prepared by containing a silver chlorobromide emulsion on baryta paper, was exposed to light, developed fixed, washed, and then dried with heating by means of a ferrotype machine. The emulsion layer was found melted and the print image distorted and blurred. On the contrary, when a print paper prepared by coating an emulsion incorporated with the compound (4) in an amount of 1.5% based on gelatin was treated in the same manner as mentioned above, there was obtained a clear print image without any distortion.

EXAMPLE 4

A high-sensitivity color print paper prepared by adding to each coating layer the compound (2) in an amount corresponding to 2.5% based on gelatin showed a dissolution temperature in water of 75° C. after 2 days and became insoluble even in boiling water after one week. The dissolution temperature of a coating layer, used as control, containing no hardener was 31° C. The hardened emulsion layer of the present invention showed no hindrance to color development caused by the addition of the hardener, and there was obtained a clear print image.

EXAMPLE 5

To a neutral process silver iodobromide emulsion prepared from 18 g of gelatin and 7.5 g in terms of silver nitrate of silver iodobromide and sensitized with sulfur and silver, was added and aqueous solution of the compound (7) so that several emulsions containing said compound in varied amounts based on 100 g of gelatin as shown in Table 2 may be obtained. Each emulsion was adjusted to pH 6.5 and coated on a photographic RC (resin-coated) paper stock which had been precoated on both sides with polyethylene and containing no volatile hardener such as formaldehyde, the coverage being 1.25 g/$m^2$ in terms of silver nitrate of silver halide and 3 g/$m^2$ of gelatin. For comparison, an emulsion of the same composition as used above except for omission of the hardener was coated in the same manner as above. After drying, each of the test specimens was left standing for 2 days under ambient conditions or under accelerating conditions of 50° C. and 80% RH. Each specimen was then exposed to light through a stepped optical wedge, developed in Kodak D-72 (1:2) developer solution at 20° C. for 2 minutes, fixed, washed with water, and tested for sensitivity and fog density. In another test, the specimen was immersed in a 4% aqueous solution of $Na_2CO_3.H_2O$ at 20° C. for 3 minutes and tested for the minimum load, in g, applied to a ball-pointed needle, which is required for the ball point, 1 mm in ball point diameter, to mark a scratch on the emulsion film surface when the ball-pointed needle was allowed to travel in contact with the specimen surface at right angle at a rate of 1 cm/sec.

Table 2

| Amount of hardener; g | Left for 2 days under ambient conditions | | | Left for 2 days at 50° C and 80% RH | | |
|---|---|---|---|---|---|---|
| | Rel. sensitivity | Fog density | Film strength, g | Rel. sensitivity | Fog density | Film strength, g |
| 0 | 100 | 0.02 | 5 | 96 | 0.04 | 7 |
| 1 | 99 | 0.02 | 33 | 94 | 0.05 | 38 |
| 3 | 98 | 0.02 | 41 | 94 | 0.04 | 45 |
| 5 | 99 | 0.02 | 45 | 95 | 0.05 | 50 |

From Table 2, it is apparent that according to this invention, there is obtained a gelatin-containing photographic layer which has been hardened in a short period of time after coating without significant effects on the sensitivity and fog density.

EXAMPLE 6

In a mixture of 4 ml of dibutyl phthalate and 10 ml of ethyl acetate, was dissolved 2.5 g of 2,4-dichloro-6-[α-(2,4-di-tert-pentylphenoxy)butyrylamino]cresol with heating at 60° C. The resulting solution was added to 70 ml of an aqueous solution containing 3.5 g of gelatin and 0.25 g of sodium dodecylbenzenesulfonate at 40° C. and emulsified by vigorously agitating in a homogenizer to prepare an emulsion of the above coupler. The emulsion was mixed with 400 g of a photographic emulsion containing 20 g of gelatin and $8 \times 10^{-2}$ mole of silver chlorobromide (75 mole-% of silver bromide and 25 mole-% of silver chloride). The resulting emulsion mixture was divided into 4 equal portions. Each portion was admixed with the compound (9) as hardner in an amount shown in Table 3 per 100 g of gelatin contained in the emulsion mixture. The emulsion mixture was adjusted to a final pH of 6.5 and coated on a subbed polyester film base at a coverage of 1.3 g/$m^2$ in terms of silver nitrate. After drying, the test specimens thus prepared were left for 2 days under ambient conditions or under accelerating conditions of 50° C. and 80% RH. Each test specimen was then exposed to light through a stepped optical wedge and then developed in the following developing solution at 25° C. for 6 minutes.

| | | |
|---|---|---|
| Sodium hydroxide | 1.65 | g |
| Sodium metaborate | 5.0 | g |
| Sodium sulfite, anhydrous | 1.8 | g |
| Potassium bromide | 0.5 | g |
| 4-Amino-N-ethyl-N-(β-methanesulfonamidoethyl)-m-toluidine sesquisulfate monohydrate | 4.4 | g |
| Sodium hexametaphosphate | 0.5 | g |
| Hydroxylamine hydrochloride | 1.0 | g |
| Benzyl alcohol | 24 | ml |
| Diethylene glycol | 10 | ml |
| Water to make up to | 1 | l |

The developed specimen was then bleached and fixed at 25° C. for 4 minutes in an iron ethylenediaminetetraacetate (EDTA) bleaching and fixing bath of the following composition.

| | | |
|---|---|---|
| EDTA iron salt | 56 | g |
| EDTA disodium salt | 2 | g |
| Ammonium thiosulfate | 60 | g |
| Sodium sulfite, anhydrous | 20 | g |
| Disodium phosphate | 12 | g |
| Sodium hydrogensulfite | 5 | g |
| Water to make up to | 1 | l |

The specimen thus treated was washed with water for 8 minutes and dipped in a stabilizer bath at 25° C. for 3 minutes. The specimen was tested for the sensitivity of the cyanine dye image and the fog density. In another test, the specimen was immersed at 25° C. for 6 minutes in the same developer solution as used above and then tested for the coating film strength. The reference value of the relative sensitivity was that of an control emulsion incorporated with 0.5 g of a hardener, because the emulsion coating layer of a specimen prepared without using a hardener was soluble in the above developer solution.

Table 3

| Amount of hardener g | Left for 2 days under ambient conditions | | | Left for 2 days at 50° C and 80% RH | | |
|---|---|---|---|---|---|---|
| | Rel. sensitivity | Fog density | Film strength, g | Rel. sensitivity | Fog density | Film strength, g |
| 0.5 | 100 | 0.05 | 10 | 94 | 0.07 | 15 |
| 1 | 98 | 0.05 | 28 | 93 | 0.07 | 33 |
| 3 | 98 | 0.06 | 37 | 94 | 0.08 | 42 |
| 5 | 99 | 0.05 | 45 | 93 | 0.07 | 48 |

From Table 3, it is apparent that when used in a color-photographic emulsion layer, the present hardener does not affect the sensitivity and fog density, is able to harden a color-photographic emulsion layer in a short period of time after coating, and scarcely shows overhardening under accelerating conditions. Similarly, when used in a layer containing a yellow dye forming coupler or a magenta dye forming coupler, the present hardener did not increase the relative sensitivity or the fog density and there was obtained a coating film strength similar to that shown in Table 3.

EXAMPLE 7

A silver iodobromide emulsion prepared in the same manner as in Example 5 was divided into 5 portions. To each portion, were added, respectively, the following hardeners in an amount of 2 g per 100 g of gelatin.

(a) The compound (7);

(b) Formaldehyde;

(c) Hardener DIS (a vinyl sulfone hardener; Trademark for Carbide Hoechst Corp.);

(d) N,N',N''-Triacryloylhexahydro-s-triazine;

(e) N,N'-Methylenebis[β-(vinylsulfonyl)propionamide].

Each emulsion was coated on the same RC paper stock as used in Example 5 at a coverage of 1.25 g/m$^2$ in terms of silver nitrate and 3 g/m$^2$ of gelatin. After drying, the resulting coated paper was cured under an atmosphere of 20° C. and 58% RH or 50° C. and 80% RH, the atmosphere having been equilibrated with a saturated $NaBr.2H_2O$ solution. The cured specimens were tested for the coating film strength in the same manner as in Example 5 to compare the strengths with one another.

Table 4

| Incorporated hardener compound | 20° C, 58% RH | | | 50° C, 80% RH |
|---|---|---|---|---|
| | 2 days | 8 days | 30 days | 3 days |
| (a) | 37 | 38 | 40 | 45 |
| (b) | 24 | 36 | 60 | 84 |
| (c) | 31 | 32 | 35 | 40 |
| (d) | 12 | 20 | 41 | 78 |
| (e) | 30 | 32 | 34 | 38 |

The above results clearly showed that the emulsion layers containing the present hardeners reach the intended hardening level in a short period of time after coating and that the present hardeners give higher film strengths as compared with known hardeners having two vinyl sulfone groups in the molecule.

What is claimed is:

1. A compression comprising gelatin and a hardener of the formula:

$$(CH_2=CH-SO_2-CH_2-CH_2-CO-A)_{\overline{n}}P,$$

wherein each A, which may be either the same or different, is selected from direct bond, —NH— and —O—, P represents an n-valent aliphatic moiety which can be interrupted by a nitrogen atom or phenylene radical, and n is 3 or 4, provided that when A is direct bond the nitrogen atom interrupting said aliphatic moiety can be connected through the direct bond.

2. A composition of matter comprising gelatin and a hardener of the formula:

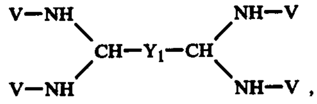

wherein V represents $CH_2=CHSO_2CH_2CH_2CO$ and $Y_1$ is a phenylene radical or $-(CH_2)_{\overline{m}}$, where m is zero or an integer from 1 to 3.

3. A gelatin-containing photographic layer characterized by containing as a hardener therein a compound of the formula:

$$(CH_2=CH-SO_2-CH_2-CH_2-CO-A)_{\overline{n}}P,$$

wherein each A, which may be either the same or different, is selected from direct bond, —NH— and —O—, P represents an n-valent aliphatic moiety which can be interrupted by a nitrogen atom or phenylene radical, and n is 3 or 4, provided that when A is direct bond the nitrogen atom interrupting said aliphatic moiety can be connected through the direct bond.

4. A gelatin-containing photographic layer characterized by containing as a hardener therein a compound of the formula:

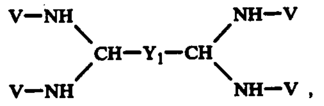

wherein V represents $CH_2=CHSO_2CH_2CH_2CO$ and $Y_1$ is a phenylene radical or $-(CH_2)_{\overline{m}}$, where m is zero or an integer from 1 to 3.

5. A gelatin-containing photographic layer according to claim 3, wherein the compound of the formula $$(CH_2=CH-SO_2-CH_2-CH_2-CO-A)_{\overline{n}}P$$

is

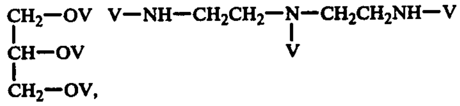

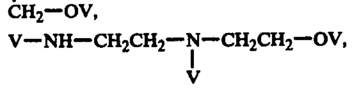

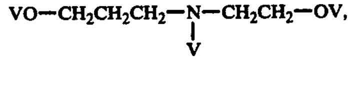

-continued

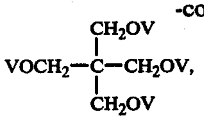

$(VOCH_2CH_2)_3N$, $CH_3C(CH_2OV)_3$,
or
$CH_3CH_2C(CH_2OV)_3$, where V represents $CH_2=CHSO_2CH_2CH_2CO$.

6. A gelatin-containing photographic layer according to claim 4, wherein the compound of the formula

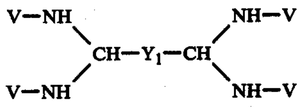

is

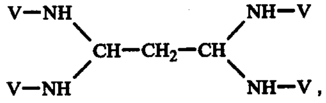

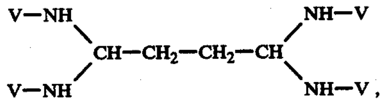

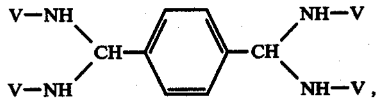

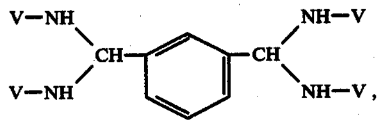

or

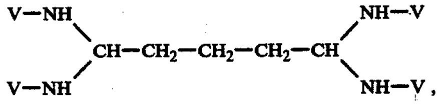

where V represents $CH_2=CHSO_2CH_2CH_2CO$.

7. A gelatin-silver halide photographic emulsion for use in color photography containing a coupler and as a hardener therein a compound having the general formula:

$$(CH_2=CH-SO_2-CH_2-CH_2-CO-A)_{\overline{n}}P,$$

wherein each A, which may be either the same or different, is selected from direct bond, —NH—, and —O—, P represents an n-valent aliphatic moiety which can be interrupted by a nitrogen atom or phenylene radical, and n is 3 or 4, provided that when A is direct bond the nitrogen atom interrupting said aliphatic moiety can be connected through the direct bond.

8. A gelatin-silver halide photographic emulsion for use in color photography containing a coupler and as a hardener therein a compound having the general formula:

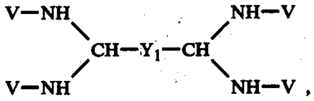

wherein V represents $CH_2=CHSO_2CH_2CH_2CO$ and $Y_1$ is a phenylene radical or $-(CH_2)_{\overline{m}}$, where m is zero or an integer from 1 to 3.

9. A composition according to claim 1, wherein the amount of the hardener is 0.1–10 percent by weight of gelatin based on the dry weight.

10. A gelatin-containing photographic layer according to claim 3, wherein the amount of the hardener is 0.1–10 percent by weight of gelatin based on the dry weight.

11. An emulsion according to claim 7, wherein the amount of the hardener is 0.1–10 percent by weight of gelatin based on the dry weight.

12. A method for hardening a gelatin-silver halide photographic emulsion, characterized in that a hardener having the general formula:

$$(CH_2=CH-SO_2-CH_2-CH_2-CO-A)_{\overline{n}}P$$

(wherein each A which may be either the same or different, is selected from direct bond, —NH— and —O—, P represents an n-valent aliphatic moiety which can be interrupted by a nitrogen atom or phenylene radical, and n is 3 or 4, provided that when A is direct bond the nitrogen atom interrupting said aliphatic moiety can be connected through the direct bond, is incorporated in said emulsion.

13. A method for hardening a gelatin-silver halide photographic emulsion, characterized in that a hardener having the general formula:

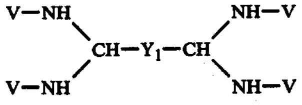

(wherein V represents $CH_2=CHSO_2CH_2CH_2CO$ and $Y_1$ is a phenylene radical or $-(CH_2)_{\overline{m}}$, where m is zero or an integer from 1 to 3) is incorporated in said emulsion.

14. A composition according to claim 1 wherein the hardener is present in an amount effective to harden the gelatin.

* * * * *